Dec. 2, 1930.  C. Q. GAREY  1,783,565
CHUCK OPERATING MECHANISM FOR AUTOMATIC SPINDLE SCREW MACHINES
Filed Feb. 6, 1928   2 Sheets-Sheet 1
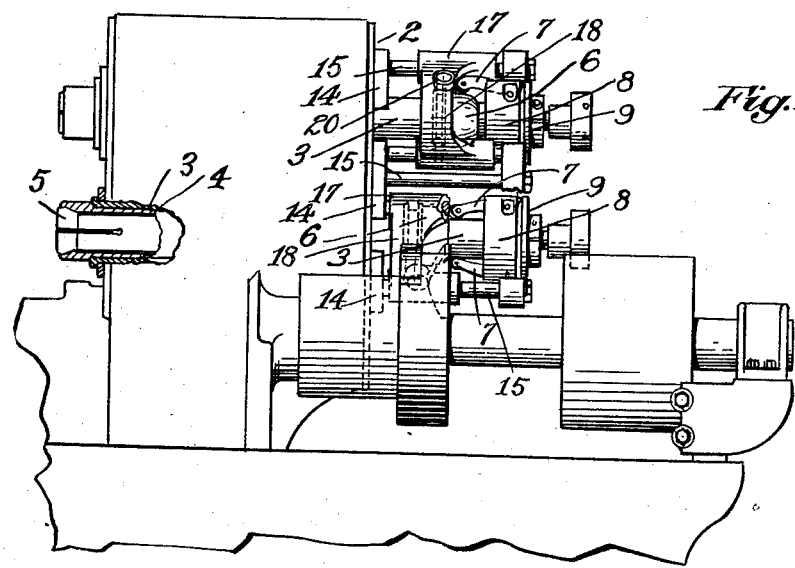
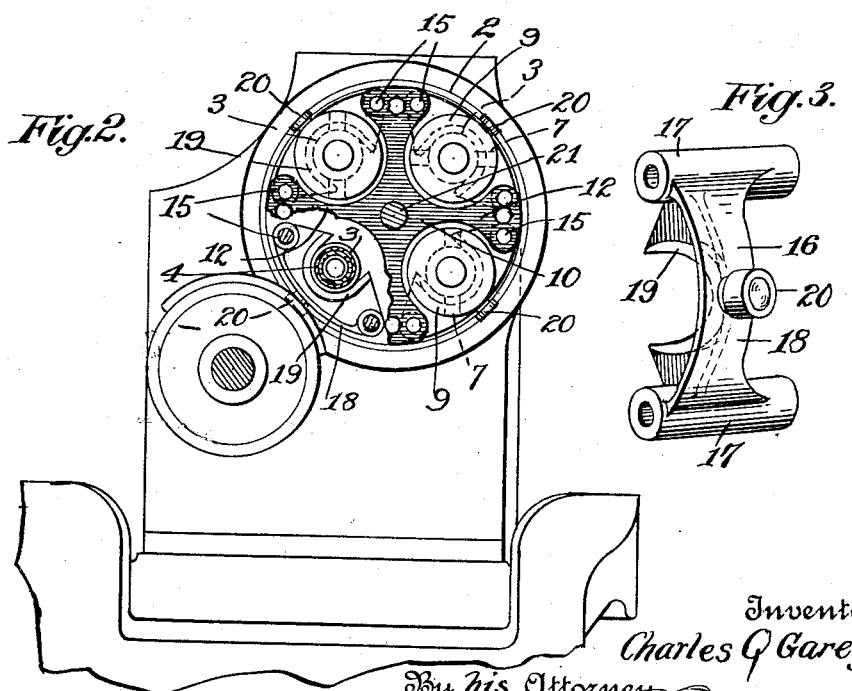
Inventor
Charles Q Garey
By his Attorney Dec. 2, 1930.   C. Q. GAREY   1,783,565
CHUCK OPERATING MECHANISM FOR AUTOMATIC SPINDLE SCREW MACHINES
Filed Feb. 6, 1928   2 Sheets-Sheet 2
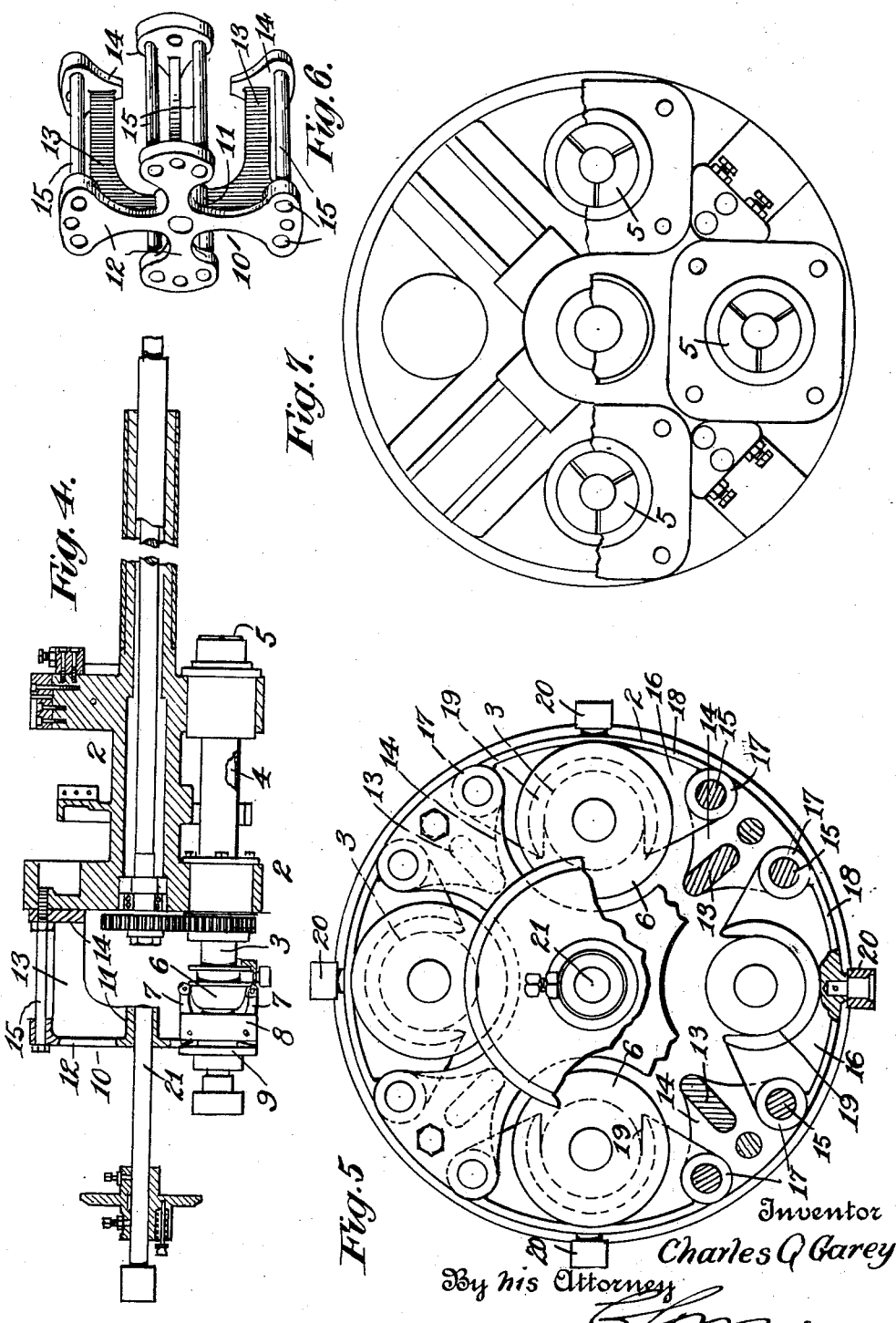
Inventor
Charles Q Garey
By his Attorney Patented Dec. 2, 1930

1,783,565

UNITED STATES PATENT OFFICE

CHARLES Q. GAREY, OF WINDSOR, VERMONT, ASSIGNOR TO THE NATIONAL ACME COMPANY, OF CLEVELAND, OHIO, A CORPORATION OF OHIO

CHUCK-OPERATING MECHANISM FOR AUTOMATIC SPINDLE-SCREW MACHINES

Application filed February 6, 1928. Serial No. 252,174.

This invention relates to metal working machines such as those commonly known as automatic screw machines, and it more particularly relates to the chuck or collet operating mechanism of the work spindles of an automatic multiple spindle screw machine, the object of the invention being to provide an improved chuck or collet operating mechanism simple in construction and assemblage whereby the clutch finger spools may be shifted without any tendency to tip the spools, thus preventing cramping and binding thereof and thereby decreasing the wear thereon and on the bronze shoes for operating them and also on the bearings for the spindles.

In the automatic multiple spindle screw machines of The National Acme Company as heretofore constructed, it has been the practice to provide a slide shiftable longitudinally on a bar mounted on the bed or frame of the machine, which slide was provided with a straight bronze shoe for engaging with the groove of each work spindle spool in sequence as the spindle carrier and the work spindles were indexed. Cams on a cam drum carried by the cam shaft engaged this shoe and shifted it back and forth to shift each spool as it was indexed into position into and out of engagement with the chuck operating fingers, thereby to open or close the chuck carried by the work spindle, so that as the work carrier and its work spindles were indexed, each of these spools would be successively engaged by the same slide shoe and the spools thus shifted to operate the chucks. The disadvantage of this construction was that only a comparatively straight shoe could be used, by reason of the fact that the grooved spools moving in a circular path during the indexing thereof had to enter and pass out of this shoe on the indexing of the work spindle carrier, and consequently the pressure necessary to force the spools underneath the fingers to close the chuck was exerted at one side or one point of the spools only, thereby cramping or binding the spools on the spindle and causing excessive wear not only on the spools and shoe, but also on the work spindle bearings. One of the advantages of the present improved chuck operating means is that each spool is provided with its own shoe and is, therefore, rotated with the work carrier, so that it is in permanent engagement with the spool at all times and can engage the spool for about seventy-five per cent. (75%) of the surface thereof, so that the strain of shifting the spool, instead of being imparted thereto at one point as heretofore, is now equalized around approximately three-fourths of the surface of the spool, and consequently there is no tendency to tip and bind the spool, so that the wear on the bronze shoe, as well as on the spool and the work spindle bearings, is very materially decreased. Another advantage is that the shoes can be supported at opposite ends thereof instead of centrally thereof, and consequently torsional and twisting movement thereof prevented, so that the shoes can be more freely shifted.

In the drawings accompanying and forming a part of this specification—

Figure 1 is a side view of the work spindle carrier end of a machine of the class described;

Fig. 2 is a rear end view thereof, parts thereof being broken away;

Fig. 3 is a perspective detail view of one of the spool-shifting shoes;

Fig. 4 is a longitudinal sectional view of the work spindle carrier and one of the work spindles therein;

Fig. 5 is an enlarged view, partly broken away and partly in section, of this improved chuck operating mechanism;

Fig. 6 is a perspective detail view of the spider for supporting the chuck operating shoes; and Fig. 7 is a front view, partly broken away, of the work spindle carrier, illustrating the chucks.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

An automatic multiple spindle screw machine is usually provided with a sliding tool carrier and an indexible work spindle carrier indexed by suitable means from a cam shaft which is rotated by mechanism provided for that purpose. Mounted in this carrier is the desired number of work spindles, rotated by suitable gears from the main driving shaft passing centrally through the carrier. In the present instance the work spindle carrier 2 comprises a series of disks and mounted in these disks are the work spindles 3, each spindle being made up of a plurality of tubes one within another, one for feeding the work and another, as 4, for shifting the chuck 5 carried thereby at the front end of the work spindle. The rear end of each spindle is provided with a finger clutch mechanism—this comprising a shiftable grooved clutch spool 6 mounted on the work spindle, a pair of spring-actuated fingers 7 carried by a collar 8, the rear ends of which fingers co-operate with a collar 9 fast to the rear end of the chuck tube 4. The fingers are fulcrumed by eccentrically-located pins so that the radial opening movement of the fingers shifts the collar 9 in such manner that the chuck tube will be shifted longitudinally and the chuck thereby opened or closed. The fingers are spread by shifting the clutch spool 6 into engagement therewith and are closed by the spring provided for that purpose. This is the usual mechanism for operating the chuck tube and a more detailed description thereof is not deemed necessary, since the present improvement has to do with the means for operating these spools. A spider-formed frame 10 (see Fig. 6) is provided which comprises a hub 11 having branching arms 12, shown as four in number corresponding in the present instance with the number of the work spindles. These arms are connected by webs 13 with triangularly-formed plates 14 which are bolted to the rear end of the work carrier. Each arm and its plate support a pair of spaced rods 15. Located on each adjoining pair of rods carried by a pair of the arms is a sliding bronze shoe 16 having a yoked or forked formation 19 for projection into the groove of the spool, and this yoke is so constructed as to encircle about seventy-five per cent. (75%) of the finger operating spool. Each of these shoes comprises a pair of tubular members or sleeves 17 connected by a curved web 18 carrying the yoke 19 hereinbefore described and at the opposite side thereof a cam roll 20, whereby the shoe is shifted back and forth on its supporting rods when each roll comes into engagement during the indexing of the carrier and the spider therewith with a suitable cam carried on the cam drum hereinbefore referred to. Thus, in the present improvement, each spool is operated by its own shoe yoke which is permanently in contact with it at all times, traveling back and forth on the bars of the spider made fast to the spindle carrier and, therefore, turning therewith when it is indexed instead of, as has been the usual practice, having the several spools operated by the same yoke when the spools were indexed into engagement therewith. Consequently, in the present improvement, the yoke can engage the spool, as hereinbefore stated, throughout about three-fourths of its surface and thereby prevent any tipping and consequent binding or cramping of the spool and thus materially reducing wear upon the associated parts.

The hub 11 of the spider is bored for the reception of a suitable supporting rod 21 projecting rearwardly thereof, and which rod is suitably supported at its opposite end.

It will be observed that in the present improvement, by reason of the fact that the sliding shoes are mounted on a pair of adjoining rods on a pair of arms, these shoes thus extend under the spindles and consequently can be efficiently operated through the medium of the cam roll located at the under side of the spindle. In other words, the shoes engage the part to be operated from the under side thereof upwardly and are in turn operated by a cam roll at the bottom of the shoes, so that any tendency of the shoes to be shifted sidewise as they are carried by the indexible carrier into position to engage the cams on the cam drum of the cam shaft, is reduced to a minimum, and consequently the throwing of the spindles out of alignment prevented, while, furthermore, the shoes are efficiently supported at their opposite ends by adjoining rods on a pair of arms which permits the sliding thereof more efficiently.

Furthermore, by reason of the construction in which a spider-formed frame carries the rods, these rods are thus supported at both ends thereof so that the rods and frame form a unitary structure, detachable as a whole from the work carrier. By reason of this construction, each operating clutch shoe is not only supported by its own rods, but is also supported by the entire spider-formed frame, so that if some of the screws which hold the spider to the work carrier should become loose, the shoes would still be efficiently supported on the spider because it is a complete unit.

It is not to be overlooked that the greatest strain upon the clutch and the spool-operating means comes at a time when the chuck is closed, and therefore when the wedge 6 is opening the arms 7, and at this time the wedge 6 and the operating yoke are furthest away from the work spindle carrier. Therefore, it is essential, in order to have these parts work efficiently, that they be effectively supported against vibration and this is accomplished in the present instance by reason of the spider-formed frame which supports the rods carrying the sliding yoke at both ends thereof, so that these rods are not free at their outer ends to overhang. It is to be noted that the spider is also reinforced by wedges or ribs and is thus made in one housing, so that each operating yoke is supported not only by a pair of rods carried by a pair of arms, but, because of the unitary structure, by all of the arms of the spider.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In an automatic multiple spindle screw machine having an indexible work carrier carrying a plurality of rotary work spindles provided with chucks and finger-operating clutch spools for shifting said chucks, the combination of a spider-formed frame secured to the carrier for indexible movement therewith and having a plurality of branching arms, each having a pair of rods carried thereby supported at both ends by the spider frame, a sliding shoe mounted on a pair of adjoining rods of a pair of arms, and means for sliding said shoe.

2. In an automatic multiple spindle screw machine having an indexible work carrier carrying a plurality of rotary work spindles provided with chucks and finger-operating clutch spools for shifting said chucks, the combination of a spider-formed frame secured to the carrier for indexible movement therewith and having a plurality of branching arms, each having a pair of rods carried thereby supported at both ends by the spider frame, a sliding shoe mounted on a pair of adjoining rods of a pair of arms, and means for sliding said shoe, said shoe having a yoke constructed to engage approximately seventy-five per cent of the surface of its spool.

3. In an automatic multiple spindle screw machine having an indexible work carrier carrying a plurality of rotary work spindles provided with chucks and finger-operating clutch spools for shifting said chucks, the combination of a spider secured to said carrier for indexible movement therewith, comprising a plurality of branching arms, each having a pair of rods secured thereto supported at both ends by the spider frame, shoes mounted on a pair of adjoining rods of a pair of arms for sliding movement and adapted to co-operate with the chuck-operating spools, a cam roll carried by each of said shoes, a cam shaft, and means carried thereby for successively engaging the cam rolls of the shoes thereby to slide the same when the carrier is indexed.

4. In an automatic multiple spindle screw machine having an indexible work carrier carrying a plurality of rotary work spindles provided with chucks and finger-operating clutch spools for shifting said chucks, the combination of a spider secured to said carrier for indexible movement therewith, comprising a plurality of branching arms, each having a pair of rods secured thereto supported at both ends by the spider frame, shoes mounted on a pair of adjoining rods of a pair of arms for sliding movement and adapted to co-operate with the chuck-operating spools, a cam roll carried by each of said shoes, a cam shaft, and means carried thereby for successively engaging the cam rolls of the shoes thereby to slide the same when the carrier is indexed, each of said shoes having engagement with its clutch spool for about seventy-five per cent of the surface thereof.

5. In a machine of the class described having an indexible carrier provided with rotary work spindles having chuck-operating mechanism, the combination of a spider-formed frame secured to said carrier for indexible movement therewith, said frame comprising a plurality of branching arms having web-connected plates, each arm and plate having a pair of rods secured thereto supported at both ends by the spider frame, a sliding shoe mounted on a pair of adjoining rods of a pair of arms and comprising a pair of web-connected sleeves having a yoke at one side and a cam roll at its opposite side, and means for shifting said shoe.

6. In a machine of the class described having an indexible carrier provided with rotary work spindles having chuck-operating mechanism, the combination of a spider-formed frame secured to said carrier for indexible movement therewith, said frame comprising a plurality of branching arms having web-connected plates, each arm and plate having a pair of rods secured thereto supported at both ends by the spider frame, a sliding shoe mounted on a pair of adjoining rods of a pair of arms and comprising a pair of web-connected sleeves having a yoke at one side and a cam roll at its opposite side, and means for shifting said shoe, said yoke constructed to engage about seventy-five per cent of the surface of its spool.

7. A clutch operating mechanism comprising a spider having a hub provided with branching arms carrying forwardly projecting webs terminating in triangularly formed plates adapted to be secured to the end of an indexible carrier, each of said plates and arms having a pair of spaced rods supported at both ends by the spider frame, and a yoke-formed shoe mounted on a pair of adjoining rods of a pair of arms.

8. A clutch operating mechanism comprising a spider having a hub provided with branching arms carrying forwardly projecting webs terminating in triangularly formed plates adapted to be secured to the end of an indexible carrier, each of said plates and arms having a pair of spaced rods supported at both ends by the spider frame, and a yoke-formed shoe mounted on a pair of adjoining rods of a pair of arms, said shoe comprising a pair of sleeve formed ends, web-connected and having at one side a yoke and at the opposite side a cam roll.

9. In a multiple spindle screw machine having an indexible carrier, a spider-formed frame secured to the rear of the carrier for indexible movement therewith, said frame having a plurality of sets of spaced rods supported at both ends by the spider frame, and a yoke-formed shoe mounted on a pair of adjoining rods of opposing sets and provided with means for operating the shoe.

10. In a multiple spindle screw machine having an indexible carrier, a spider-formed frame secured to the rear of the carrier for indexible movement therewith, said frame having a plurality of sets of spaced rods supported at both ends by the spider frame, and a yoke-formed shoe mounted on a pair of adjoining rods of opposing sets and provided with means for operating the shoe, said yoke constructed to engage about seventy-five per cent of the surface of the member with which it is adapted to co-operate.

11. A clutch spool operating shoe comprising a curved web having a cam roll on its convex face midway of the length thereof and terminating at its ends in elongated sleeves and having on the concave side thereof a transversely-extending web having a yoke formation whereby the curvature of the shoe is in the direction of the projection of the yoke.

12. A clutch spool operating shoe comprising a pair of spaced sleeve-formed ends connected by a curved web having at one side a yoke and at the opposite side a cam roll, said web being curved in the direction of the projection of the yoke and said yoke having a construction adapting it to engage about seventy-five per cent of a clutch spool.

13. A clutch spool-operating shoe having a curved formation and provided at one side with a cam roll and at the opposite side with a yoke, the curvature of the shoe being in the direction of the projection of the yoke and said yoke constructed to engage about seventy-five per cent of the surface with which it is adapted to co-operate.

14. A clutch spool-operating shoe having a curved formation and terminating at each end in a sleeve for the reception of a rod and provided at one side with a cam roll and at the opposite side with a yoke, the curvature of the shoe being in the direction of the projection of the yoke and said yoke constructed to engage about seventy-five per cent of the surface with which it is adapted to co-operate.

15. In a metal working machine having an indexible work carrier provided with work spindles and a cam shaft located under the spindles, a spider-formed frame secured to the rear of the carrier for indexible movement therewith, said frame having a plurality of sets of spaced rods supported at both ends by the spider frame, a sliding shoe extending under each spindle and having its ends mounted on a pair of adjoining rods of opposite sets, and means carried by the cam shaft for engaging the shoes at the under sides thereof.

16. In a metal working machine having an indexible work carrier provided with work spindles and a cam shaft located under the spindles, a spider-formed frame secured to the rear of the carrier for indexible movement therewith, said frame having a plurality of sets of spaced rods supported at both ends by the spider frame, a sliding shoe extending under each spindle and having its ends mounted on a pair of adjoining rods of opposite sets, and means carried by the cam shaft for engaging the shoes at the under sides thereof, each of said shoes having a yoke adapted to engage the member to be operated from the under side of said member.

17. In a metal working machine having an indexible work carrier provided with work spindles and a cam shaft located under the spindles, a spider-formed frame secured to the rear of the carrier for indexible movement therewith, said frame having a plurality of sets of spaced rods supported at both ends by the spider frame, a sliding shoe extending under each spindle and having its ends mounted on a pair of adjoining rods of opposite sets, and means carried by the cam shaft for engaging the shoes at the under sides thereof, each of said shoes having a yoke adapted to engage about 75% of the surface of the member to be operated from the under side of said members.

Signed at Windsor, Vermont, this 3rd day of February, 1928.

CHARLES Q. GAREY.